United States Patent [19]
Wells et al.

[11] Patent Number: 5,239,808
[45] Date of Patent: Aug. 31, 1993

[54] VACUUM PACKAGING MACHINE

[75] Inventors: Andrew J. Wells, Bemidii, Minn.; David A. Rausch, Olathe; Clark A. Levsen, Shawnee, both of Kans.

[73] Assignee: Hantover, Inc., Kansas City, Mo.

[21] Appl. No.: 882,311

[22] Filed: May 13, 1992

[51] Int. Cl.⁵ .................. B65B 7/06; B65B 31/02; B65B 51/14
[52] U.S. Cl. ............................... 53/512; 53/373.7; 53/374.8
[58] Field of Search ............... 53/86, 88, 373.7, 374.8, 53/510, 511, 512

[56] References Cited

U.S. PATENT DOCUMENTS

| | | | |
|---|---|---|---|
| 3,234,072 | 2/1966 | Dreeben | 53/374.8 X |
| 3,869,842 | 3/1975 | Verbeke | 53/374.8 X |
| 3,925,139 | 12/1975 | Simmons | 53/374.8 X |
| 3,958,391 | 5/1976 | Kujubu | 53/512 X |
| 3,968,629 | 7/1976 | Gidewall et al. | 53/374.8 |
| 4,545,177 | 10/1985 | Day | 53/512 X |
| 4,549,388 | 10/1985 | Lancaster | 53/374.8 X |
| 4,583,352 | 4/1986 | Heron | 53/374.8 X |
| 4,869,051 | 9/1989 | Shifley et al. | 53/374.8 X |

Primary Examiner—John Sipos
Assistant Examiner—Linda B. Johnson
Attorney, Agent, or Firm—Hovey, Williams, Timmons & Collins

[57] ABSTRACT

A vacuum packaging apparatus is provided for use in evacuating the air in an open package and sealing the evacuated package. The apparatus includes a chamber and a lid movable between an open position exposing the chamber and a closed position sealing the chamber. A sealing assembly is provided for sealing the package after air in the chamber has been evacuated. The sealing assembly includes a seal bar movable between a retracted position removed from pressing engagement with the package and an extended position in pressing engagement with the package. A piston of a piston and cylinder assembly is attached to the seal bar in a manner providing an electrical circuit through a sealing wire extending across the seal bar. The piston and seal bar are connected together in such a way as to permit the seal bar to be detached from the piston and removed from the apparatus.

9 Claims, 3 Drawing Sheets

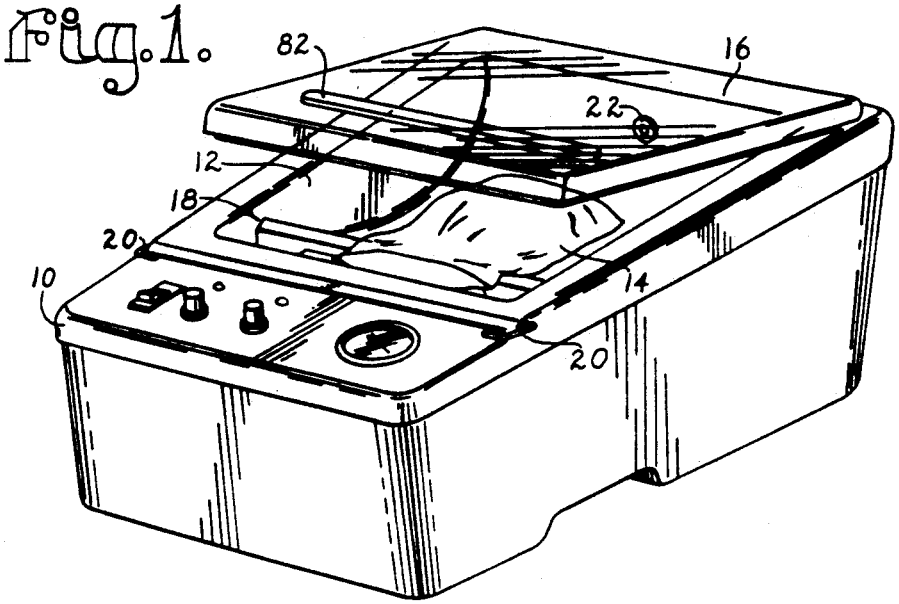
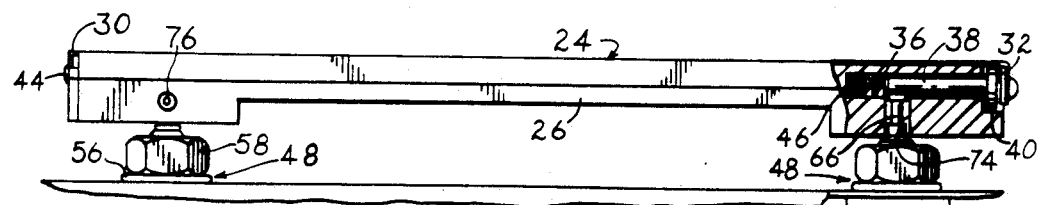
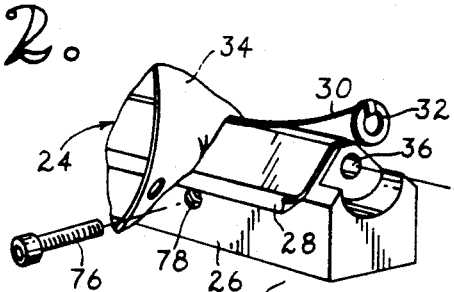

VACUUM PACKAGING MACHINE

BACKGROUND OF THE INVENTION

1 Field of the Invention

The present invention relates generally to packaging machines and, more particularly, to a vacuum packaging machine having an assembly for sealing the package after the inner volume of the package has been evacuated of air.

2. Discussion of the Prior Art

It is conventional to provide a vacuum packaging machine having an evacuation chamber within which a package is positioned during sealing. In such devices, a seal bar assembly is provided within the chamber and is movable between a storage position and a sealing position.

The seal bar assembly includes an elongated seal bar formed of an electrically insulative material, a sealing wire extending across the seal bar, a mechanism for moving the seal bar between the storage and sealing positions, and a separate electrical circuit for providing electricity to the sealing wire. The electrical circuit includes wires extending from the ends of the sealing wire out of the chamber to a power source.

Because the wires extending from the ends of the sealing wire must bend twice during each sealing cycle of the machine, fatigue failure of the wire material limits the useful life of the seal bar assembly Further, by isolating the wires from the moving mechanism and leading them from the chamber without providing a point of detachment for the wires, repair or replacement of the seal bar assembly is complicated since removal of the seal bar is difficult.

OBJECTS AND SUMMARY OF THE INVENTION

It is an object of the present invention to provide a vacuum packaging machine or apparatus having a seal bar assembly with an extended useful life relative to conventional assemblies, and obviating the adverse effects of cyclical mechanical loading of circuit elements within the seal bar assembly.

It is another object of the present invention to provide a vacuum packaging machine or apparatus in which the seal bar is easily removable for quick maintenance or replacement thereof.

In accordance with these and other objects evident from the following description of a preferred embodiment of the invention, a vacuum packaging apparatus is provided for use in evacuating the air in an open package and sealing the evacuated package. The apparatus comprises a chamber sized for receipt of a package to be evacuated and sealed, and a lid movable between an open position exposing the chamber and a closed position sealing the chamber. An evacuating means is provided for evacuating air in the chamber, and a means seals the package after air in the chamber has been evacuated.

The sealing means includes a seal bar movable between a retracted position removed from pressing engagement with the package and an extended position in pressing engagement with the package. A sealing wire extends across the seal bar, and a circuit is provided for supplying electricity to the sealing wire for heating the wire to a temperature sufficient to seal the package when the seal bar is in pressing engagement with the package.

The apparatus further includes a moving means for moving the seal bar between the retracted and extended positions. The moving means includes at least one cylinder and a piston movable within the cylinder and attached to the seal bar, the circuit including the piston. An attachment means attaches the seal bar to the piston and includes a mechanical fastener that permits the seal bar to be detached from the piston and removed from the apparatus.

By constructing a vacuum packaging machine in this manner, numerous advantages are achieved. For example, by providing a circuit which includes the piston used to move the seal bar between the retracted and extended positions, the need for wires extending from the ends of the sealing wire is eliminated, reducing the adverse effects of mechanical fatigue during cyclical use of the seal bar.

Further, by permitting detachment of the seal bar from the piston, the seal bar and sealing wire may be removed from the apparatus for repair, or may be replaced completely. Such repair or replacement does not require the separate detachment of circuit elements other than the piston.

BRIEF DESCRIPTION OF THE DRAWING FIGURES

A preferred embodiment of the invention is described in detail below, with reference to the attached drawing figures, wherein:

FIG. 1 is a perspective view of a vacuum packaging machine constructed in accordance with the preferred embodiment of the invention;

FIG. 2 is a front elevational view of the seal bar assembly, partially in section, illustrating the construction of the seal bar;

FIG. 3 is a fragmentary exploded perspective view of one end of the seal bar, illustrating the components thereof;

DETAILED DESCRIPTION OF THE PREFERRED EMBODIMENT

A vacuum packaging machine constructed in accordance with the preferred embodiment of the present invention is illustrated in FIG. 1, and includes a body 10 defining a chamber 12 sized for receipt of a package 14 to be evacuated and sealed, and a lid 16 supported on the body for pivotal movement between an open position exposing the chamber and a closed position sealing the chamber.

Figure 4:
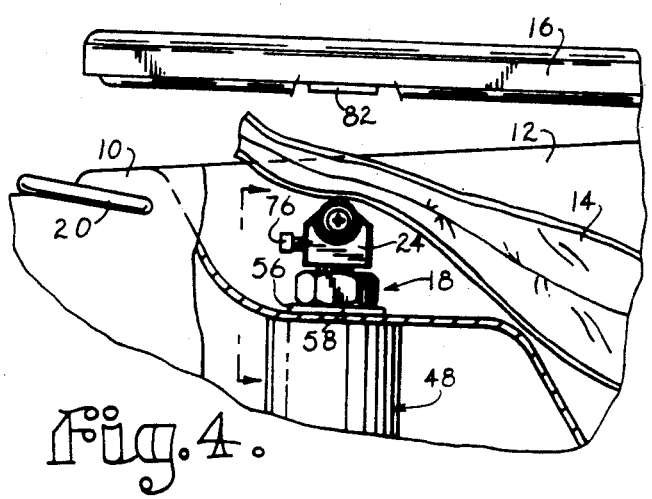
FIG. 4 is a fragmentary side elevational view of the apparatus, partially in section, illustrating the lid and seal bar assembly in a non-sealing position.
Figure 6:
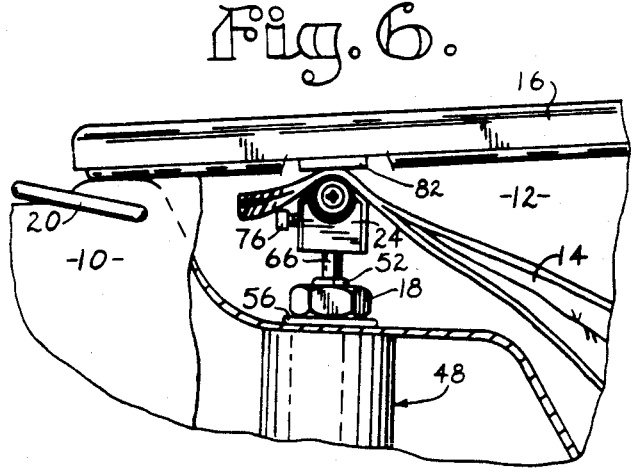
FIG. 6 is a fragmentary side elevational view of the apparatus, partially in section, illustrating the lid and seal bar assembly in a sealing position.

A seal bar assembly 18 is provided within the chamber and is movable between a retracted position removed from pressing engagement with the package, as illustrated in FIG. 4, and an extended position in pressing engagement with the package, as shown in FIG. 6. Manually operable control switches are provided on the body for permitting an operator to control the movement and operation of the seal bar assembly, and to regulate evacuation of the chamber after a package has been positioned in the chamber and the lid has been closed. Clips 20 are provided on the body and are movable into and out of locking engagement with the lid for holding the lid in sealing engagement with the body during a packaging operation.

The chamber 12 includes a port 22 through which air is evacuated during a packaging operation, as well as a pair of spaced openings in the bottom surface of the chamber through which the seal bar assembly is mounted. The port 22 is connected to a conventional evacuating means, such as a pump, for evacuating air in the chamber during a packaging operation, and is also attached to a valve for permitting air back into the chamber once the package therein has been sealed.

Although not shown, it is preferred that the valve for permitting air into the chamber includes an air inlet port that is normally closed by a stopper movable between a flow-blocking position and a flow-permitting position. An electromagnetic actuator may be provided in association with the stopper for moving the stopper to the flow-permitting position and for deactivating the evacuation pump upon completion of a packaging operation.

Turning to FIG. 2, the seal bar 24 of the seal bar assembly includes an elongated body 26 formed of an electrically insulative material such as wood. The upper surface of the body includes a flat, longitudinally extending ridge, as shown in FIG. 3, and tapered upper surfaces extending between the ridge and the sides of the body. A layer 28 of burn-resistant material, such as a tape made of "TEFLON" (polytetrafluoroethylene) or the like, covers the ridge and upper surfaces of the body 26 and is interposed between the body and a sealing wire 30 that extends along the ridge. The sealing wire is formed of an electrically conductive material, and is provided at each end with an O-ring 32 that is also formed of electrically conductive material. Preferably, an additional layer 34 of burn-resistant material, such as a tape made of "TEFLON" (polytetrafluoroethylene) or the like, covers the sealing wire and extends over the ridge, upper surfaces, and sides of the body.

An axially extending hole 36 is provided in each end of the body and an end piece 38 formed of electrically conductive material such as brass or the like is slidably received within each hole, as shown in FIG. 2. Each end piece includes a head 40 that bears against the end of the body when the end piece is pushed completely into the hole 36, and threaded openings 42 are provided in the end pieces 38 for permitting attachment of the O-rings to the end pieces by threaded fasteners 44.

Preferably, tensioning means are provided for biasing the end pieces 38 axially outward to maintain tension on the sealing wire. For example, by positioning a compression spring 46 in each hole between the body and the associated end piece, the springs bias the end pieces outward to maintain tension on the sealing wire even during heating when there is a tendency for the wire to expand. This improves the sealing operation of the seal bar assembly.

As shown in FIG. 2, the means for moving the seal bar between the retracted and extended positions includes a pair of piston-and-cylinder assemblies 48 that are spaced from one another and secured to the body of the apparatus, with the pistons 50 of the assemblies extending into the chamber 12 through the holes provided in the bottom surface of the chamber.

Preferably, an upstanding neck 52 is formed on each cylinder 54 and extends through one of the holes so that any gap existing between the neck and the edge of each hole is sealed by a sealing washer 56 and a nut 58 received on the neck. By providing this construction, the material of the body 10 is sandwiched between the washer and the cylinder to support the assembly and seal the holes.

Figure 7:
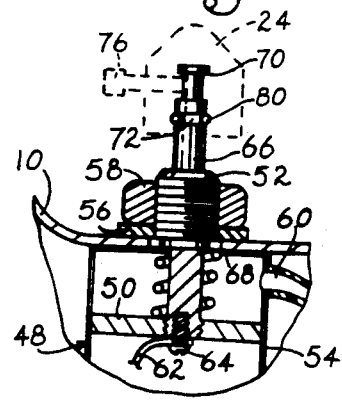
FIG. 7 is a side sectional view of the seal bar assembly, illustrating the construction of the piston and cylinder assembly, with the seal bar moved to an extended position.

Turning to FIG. 7, each cylinder is hollow and includes a port 60 adjacent the upper end of the cylinder through which the inner volume of the cylinder is in communication with the evacuation pump. The lower end of the cylinder is open to expose the bottom surface of the piston, and a wire 62 is secured to the piston by a suitable fastener 64, as shown in FIG. 6. The piston is provided with an elongated rod 66 that extends through the neck of the cylinder. A compression spring 68 rests on the piston between the piston and the upper end of the cylinder for biasing the piston, and thus the seal bar assembly toward the retracted position shown in FIGS. 4 and 5.

The upper end of each piston rod is provided with a pair of spaced annular grooves 70, 72. As shown in FIG. 2, the seal bar 24 is formed with a pair of transverse holes 74 extending between the bottom of the seal bar and the axial holes 36. The rods 66 are received in the transverse holes 74 of the seal bar, and threaded fasteners 76 are provided for attaching the seal bar to the piston rods. Preferably, threaded openings 78 are provided in a side of the body for receiving the threaded fasteners 76, and the fasteners, when tightened, extend into the annular groove 70 of each piston rod to hold the seal bar in place. A resilient O-ring 80 is provided in the lower annular groove 72 of each rod.

In operation, an unsealed package containing matter to be stored is placed into the open chamber 12 of the apparatus and the lid 16 is closed and locked in place by moving the clips 20 over the lid. Thereafter, the evacuating pump is activated to pump air within the chamber through the port 22 in order to evacuate air in the chamber.

Figure 5:
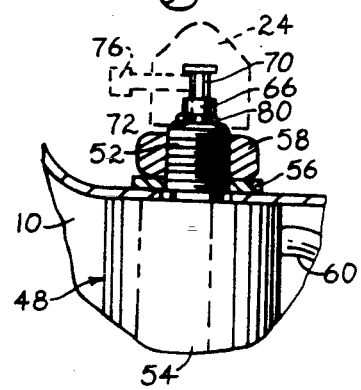
FIG. 5 is a side sectional view of the seal bar assembly, illustrating the seal bar in a retracted position.

After the evacuation pump has operated for a predetermined time, the evacuation pump is also connected to the upper volume of the cylinders 54 via ports 60, causing the pistons 50 to be drawn upward against the bias of the springs 68 from the retracted position shown in FIGS. 4 and 5, to the extended position shown in FIGS. 6 and 7. As the seal bar moves toward the extended position, it presses the package opening against a backing member 82, formed of a resilient material such as silicon or the like, which is provided on the lid.

Electricity is supplied to the sealing wire 30 by the circuit including the wires 62, pistons 50, end pieces 38, O-rings 32 and the sealing wire 30. The circuit also includes a conventional power source and a switching mechanism for controlling the timing and duration of energization of the sealing wire.

The sealing wire is heated by the flow of electricity therethrough, the heat being sufficient to melt the material of the package so that the opposing material layers melt together to close and seal the package.

After a predetermined sealing time, controlled by the switching mechanism, the evacuation pump is deactivated and air is permitted back into the chamber 12 and cylinders 54. As air fills the cylinders, the compression springs 68 bias the pistons 50 back toward the retracted position, as shown in FIGS. 4 and 5.

Once the pressure within the chamber has equalized with ambient pressure, the clips 20 may be removed from the lid and the lid may be lifted from the body of the apparatus to permit access to the sealed, evacuated package.

If it is necessary to repair or replace the seal bar assembly 18, it is only necessary to remove the fasteners 76 and pull the seal bar 24 from the piston rods 66. Replacement of the seal bar is carried out by sliding the seal bar onto the piston rods and tightening the fasteners 76 into the annular grooves 70 of the rods. Because the mechanical elements of the assembly also comprise the circuit used to energize the sealing wire, it is not necessary to remove additional circuit elements when replacing the seal bar assembly.

Figure 8:
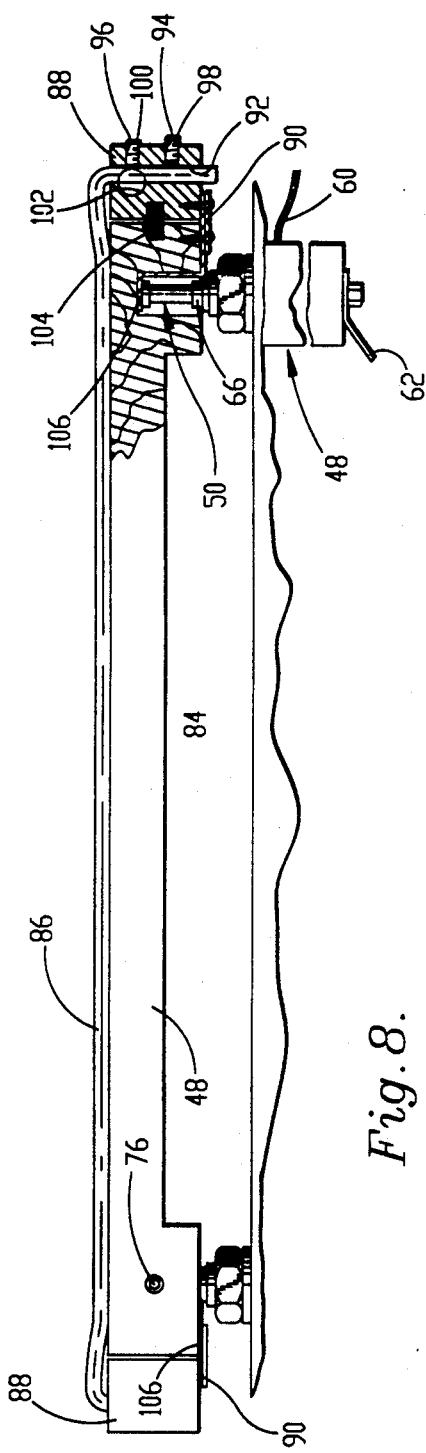
FIG. 8 is a front elevational view of an alternative construction of the seal bar assembly, partially in section.

Turning to FIG. 8, a second preferred construction of the seal bar assembly is shown. In this construction, the seal bar includes an elongated body 84 formed of an electrically insulative material such as wood. The upper surface of the body includes a flat upper surface and side walls. A layer of burn-resistent material, such as a tape made of "TEFLON" (polytetrafluoroethylene) or the like may be provided on the body between the body and a pair of sealing wires that extend along the upper surface. The sealing wires 86 are formed of an electrically conductive material. Preferably, an additional layer of burn-resistent material, such as a tape made of "TEFLON" (polytetrafluoroethylene) or the like, covers the sealing wires and extends over the body.

A mounting block 88 formed of an electrically conductive material such as brass or the like is connected at each axial end of the body by a thin leaf 90 also formed of electrically conductive material such as brass, that is fastened to both the body and block by suitable fasteners. A leaf attaches each block to the body but bends to permit some pivotal-like movement of the blocks relative to the body.

Each block 88 is provided with first and second holes 92 extending between the upper and lower surfaces thereof. These holes accommodate the ends of the sealing wires 86. Two pairs of vertically spaced, threaded holes 94, 96 are formed in the end surface of each mounting block, each pair being in association with one of the vertically extending holes 92. The two vertically spaced holes 94, 96 associated with each hole 92 extend in a direction transverse to the hole 92 and communicate therewith. A set screw 98 in each of the lower threaded holes 94 permits the sealing wires to be secured to each mounting block 88. Set screws 100 in the upper threaded holes 96 permit tensioning of the sealing wires. A through-hole 102 extends between the sides of each mounting block and communicates with the vertical holes 92 and the upper holes 96 so that when the set screws in the upper threaded holes 96 are tightened, the sealing wires 86 are urged into the open space defined by the through-hole 102. Thus, slack in the sealing wires is accommodated.

Tensioning means are provided for biasing the mounting blocks axially away from the body to maintain tension in the sealing wires. Preferably this means includes compression springs 104 positioned between the body and the mounting blocks. These springs 104 urge the mounting blocks to move in a pivotal-like fashion to maintain tension on the sealing wires.

Figure 9:
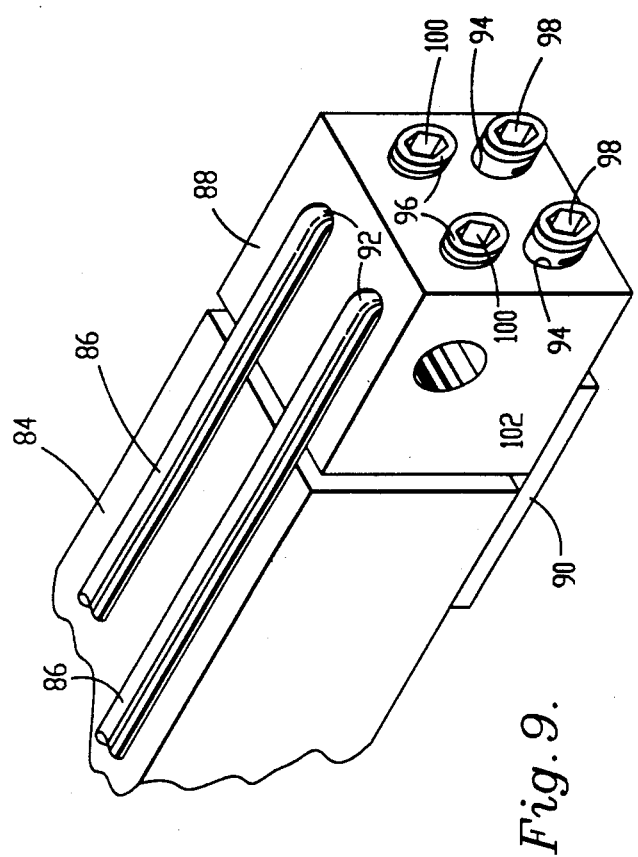
FIG. 9 is an exploded perspective view of one end of the seal bar shown in FIG. 8, illustrating the components thereof.

As with the previously described embodiment, the circuit for supplying electricity to the sealing wires includes a conventional power source and switching mechanism, the wires 62 extending from the power source and switching mechanism, and the pistons 50. However, in the second construction shown in FIGS. 8 and 9, the circuit also includes the thin leaves 90, the brass mounting blocks 88, and the sealing wires 86. Thin strips 106 of conductive material such as brass or the like extend between the piston rods 66 and the thin leaves 90 for providing electrical communication therebetween for completing the circuit.

In order to remove the seal bar, the fasteners 76 are removed, and the seal bar is lifted from the pistons 50. The thin strips 106 remain with the seal bar upon removal. Replacement of the seal bar simply requires the seal bar to be positioned on the pistons, and the fasteners 76 tightened to engage the annular grooves in the pistons.

Although the invention has been described with reference to the preferred embodiment illustrated in the drawing, it is noted that substitutions may be made and equivalents employed herein without departing from the scope of the invention as set forth in the claims.

What is claimed is:

1. A vacuum packaging apparatus for use in evacuating the air in an open package and sealing the evacuated package, the apparatus comprising:

a chamber sized for receipt of a package to be evacuated and sealed;

a lid movable between an open position exposing the chamber and a closed position sealing the chamber;

an evacuating means for evacuating air in the chamber;

a sealing means inside the chamber for sealing the package after air in the chamber has been evacuated, the sealing means including a seal bar movable between a retracted position removed from pressing engagement with the package and an extended position in pressing engagement with the package, a sealing wire extending across the seal bar, and a circuit for supplying electricity to the sealing wire for heating the wire to a temperature sufficient to seal the package when the seal bar is in pressing engagement with the package;

a moving means for moving the seal bar between the retracted and extended positions, the moving means including at least one cylinder and a piston movable within the cylinder and attached to the seal bar, the circuit including conductor means connected to the piston for conducting electrical current through the piston to the sealing wire the piston; and an attachment means for attaching the seal bar to the piston, the attachment means including a mechanical fastener that permits the seal bar to be detached from the piston and removed from the apparatus.

2. A vacuum packaging apparatus as recited in claim 1, wherein the lid includes an inside surface exposed to the chamber when the lid is in the closed position, the apparatus further comprising a backing member against which the package is pressed when the seal bar is moved to the extended position, the backing member being provided on the inside surface of the lid.

3. A vacuum packaging apparatus as recited in claim 1, wherein the seal bar includes an elongated body formed of an electrically non-conductive material, a layer of burn-resistant material covering the upper surface of the body and interposed between the body and the sealing wire, and a layer of burn-resistant material covering the sealing wire.

4. A vacuum packaging apparatus as recited in claim 1, wherein the seal bar includes an elongated body formed of an electrically non-conductive material and having axially extending holes formed in the ends thereof, and the sealing means includes a pair of elongated end pieces formed of electrically conductive material, the end pieces being connected to the ends of the sealing wire and received in the holes in the body for sliding movement relative to the body.

5. A vacuum packaging apparatus as recited in claim 4, further comprising wire tensioning means for biasing the end pieces axially outward to maintain tension on the sealing wire.

6. A vacuum packaging apparatus as recited in claim 4, wherein the moving means includes a pair of cylinders and a pair of pistons movable within the cylinders, and each end piece engages one of the pistons to provide electrical communication from each piston through the end pieces and the sealing wire to the other piston.

7. A vacuum packaging apparatus as recited in claim 1, wherein
the seal bar includes an elongated body formed of an electrically non-conductive material, and a pair of mounting blocks formed of electrically conductive material and attached to the ends of the body, the ends of the sealing wire being secured to the mounting blocks; and
the moving means includes a pair of cylinders and a pair of pistons movable within the cylinders, the apparatus further comprising connectors of electrically conductive material extending between the pistons and the mounting blocks to provide electrical communication from each piston through the mounting blocks and the sealing wire to the other piston.

8. A vacuum packaging apparatus as recited in claim 7, further comprising wire tensioning means for biasing the end pieces axially outward to maintain tension on the sealing wire.

9. A vacuum packaging apparatus as recited in claim 8, wherein the wire tensioning means includes a compression spring mounted between the body and each mounting block, and the mounting blocks are attached to the body in a manner permitting relative movement between the blocks and the body.

* * * * *